United States Patent
Kyou

(10) Patent No.: US 11,553,326 B2
(45) Date of Patent: Jan. 10, 2023

(54) COMMUNICATION DEVICE AND COMMUNICATION METHOD FOR TRANSMITTING NOTIFICATIONS TO COMMUNICATE WITH FIRST AND SECOND SOFTWARES AND TO CAUSE SECOND SOFTWARE TO BE ON STANDBY AND TO CANCEL BEING ON STANDBY

(71) Applicant: CASIO COMPUTER CO., LTD., Tokyo (JP)

(72) Inventor: Kazuho Kyou, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/184,110

(22) Filed: Feb. 24, 2021

(65) Prior Publication Data
US 2021/0274335 A1 Sep. 2, 2021

(30) Foreign Application Priority Data
Feb. 28, 2020 (JP) .............................. JP2020-032702

(51) Int. Cl.
*H04W 8/00* (2009.01)
*H04W 56/00* (2009.01)
(Continued)

(52) U.S. Cl.
CPC ....... *H04W 8/005* (2013.01); *H04W 56/0035* (2013.01); *H04W 68/12* (2013.01); *H04W 76/30* (2018.02)

(58) Field of Classification Search
CPC ..... H04W 8/005; H04W 76/30; H04W 76/34; H04W 76/36; H04W 56/0035;
(Continued)

(56) References Cited

U.S. PATENT DOCUMENTS 7,281,027 B2 * 10/2007 Komine .............. H04L 43/0811
709/219
9,706,519 B2 7/2017 Ursitti et al.
(Continued)

FOREIGN PATENT DOCUMENTS

CN 103840860 A 6/2014
CN 107835257 A 3/2018
(Continued)

OTHER PUBLICATIONS

Examination Report dated Jan. 17, 2022 received in Indian Patent Application No. IN 202114007071.
(Continued)

*Primary Examiner* — Jenee Holland
(74) *Attorney, Agent, or Firm* — Scully Scott Murphy & Presser

(57) ABSTRACT

An electronic clock which is a communication device includes: a transceiver configured to communicate with another communication device including first software and second software; and at least one processor. The processor: controls the transceiver to perform a certain communication with the first software; and causes, after the certain communication ends, the transceiver to transmit a notification for notifying the second software of the end of the certain communication.

9 Claims, 2 Drawing Sheets

(51) Int. Cl.
*H04W 68/12* (2009.01)
*H04W 76/30* (2018.01)

(58) Field of Classification Search
CPC ..... H04W 68/12; H04W 40/24; H04W 48/16; H04L 29/08648; H04L 29/0899; H04L 41/5058
See application file for complete search history.

(56) References Cited

U.S. PATENT DOCUMENTS

| | | | | |
|---|---|---|---|---|
| 2001/0040945 | A1* | 11/2001 | Fujino | H04L 65/1069 379/93.09 |
| 2004/0230687 | A1* | 11/2004 | Nakamura | H04L 67/16 709/228 |
| 2011/0243003 | A1* | 10/2011 | Oguchi | H04W 76/19 370/252 |
| 2016/0165087 | A1* | 6/2016 | Okuda | H04N 1/00896 358/1.13 |
| 2017/0318534 | A1* | 11/2017 | Takatsuji | H04W 52/0229 |
| 2019/0289143 | A1* | 9/2019 | Kinomoto | H04N 1/00344 |
| 2020/0053519 | A1 | 2/2020 | Slevinsky et al. | |

FOREIGN PATENT DOCUMENTS

| | | |
|---|---|---|
| JP | 2009-143005 A | 7/2009 |
| JP | 2016-100712 A | 5/2016 |
| WO | 2010079358 A2 | 7/2010 |

OTHER PUBLICATIONS

Notice of Reasons for Refusal dated Mar. 29, 2022 received in Japanese Patent Application No. JP 2020-032702 together with an English language translation.
First Office Action dated Feb. 28, 2022 received in Chinese Patent Application No. CN 202110220110.9 together with an English language translation.

* cited by examiner

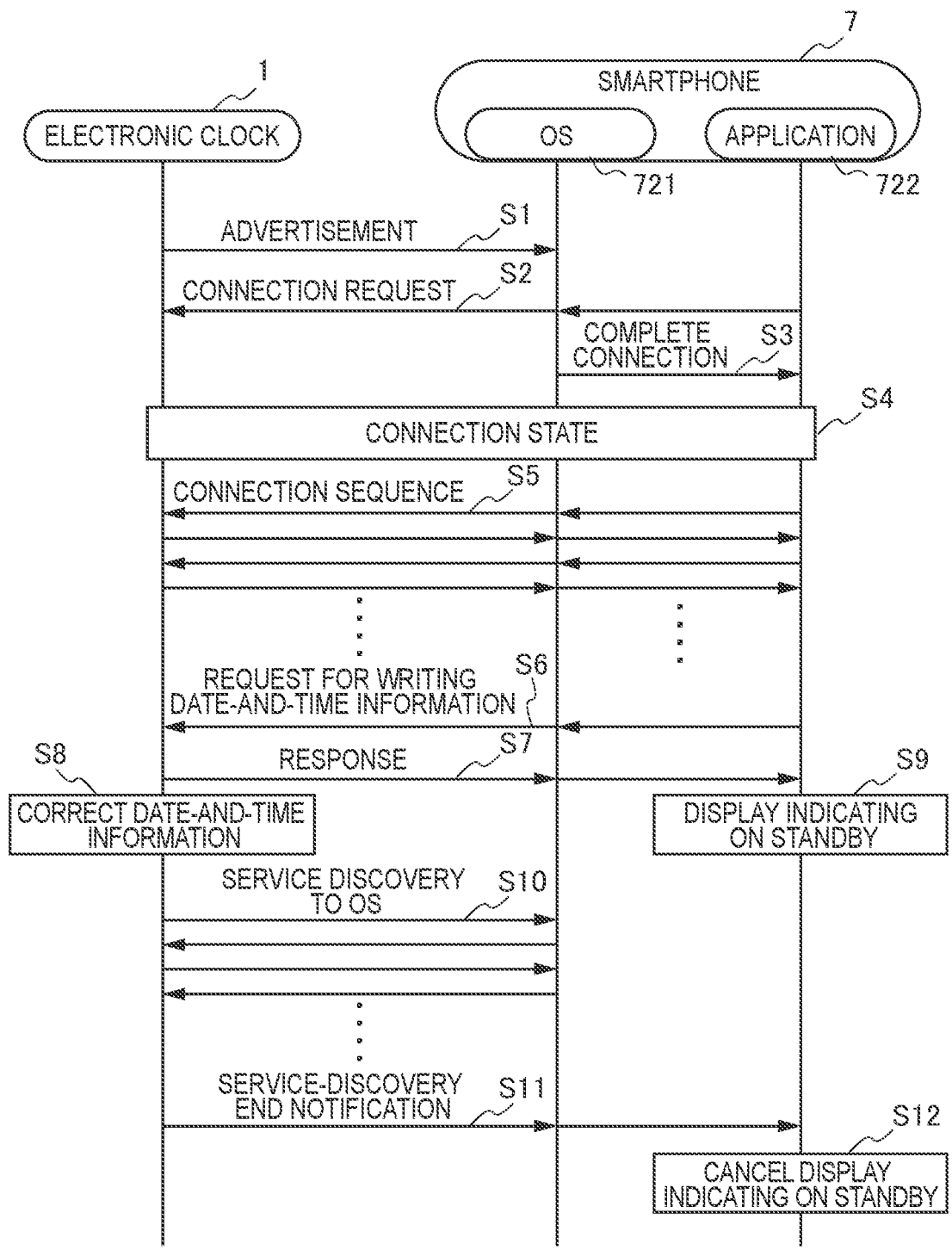

COMMUNICATION DEVICE AND COMMUNICATION METHOD FOR TRANSMITTING NOTIFICATIONS TO COMMUNICATE WITH FIRST AND SECOND SOFTWARES AND TO CAUSE SECOND SOFTWARE TO BE ON STANDBY AND TO CANCEL BEING ON STANDBY

CROSS-REFERENCE TO RELATED APPLICATION

This application is based upon and claims the benefit of priority from Japanese Patent Application No. 2020-032702, filed on Feb. 28, 2020 in Japan, the entire contents of which are incorporated herein by reference.

The present disclosure relates to a communication device, a communication system, and a communication method.

BACKGROUND

For example, JP 2009-143005 A filed in Japan discloses that a protocol called a service discovery is used to search for available services between communication devices.

SUMMARY

A communication device according to an embodiment includes: a communication transceiver configured to communicate with another communication device including first software and second software; and at least one processor, wherein the processor: controls the communication transceiver to perform a certain communication with the first software; and causes, after the certain communication ends, the communication transceiver to transmit, to the another communication device, a notification for notifying the second software of the end of the certain communication.

BRIEF DESCRIPTION OF THE DRAWINGS

FIG. 2 is a sequence diagram of starting communication between an electronic clock and a smartphone in FIG. 1.

DETAILED DESCRIPTION

Figure 1:
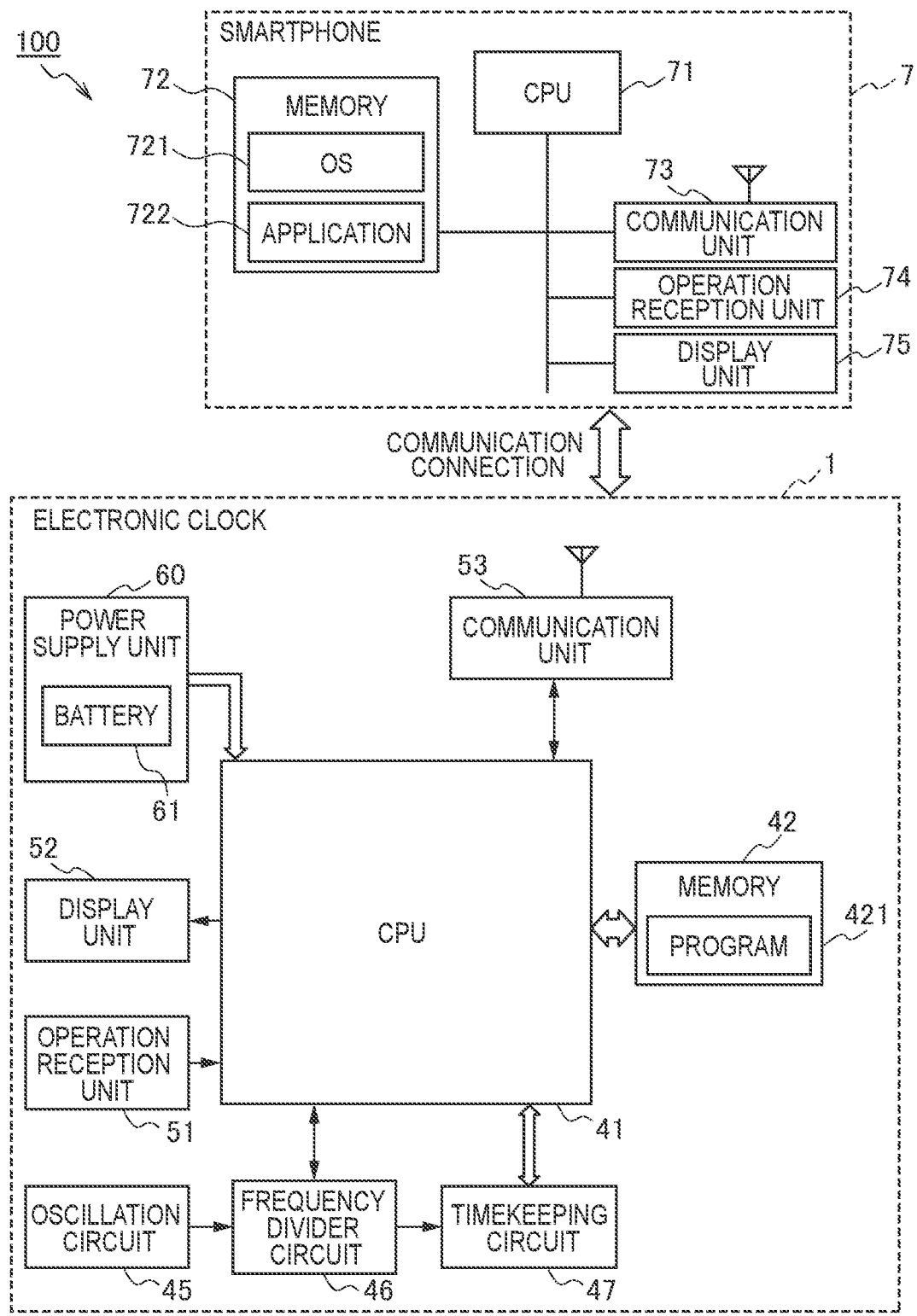
FIG. 1 is a diagram illustrating an exemplary overall configuration of a communication system of the present embodiment.

Hereinafter, an embodiment will be described in detail with reference to the drawings. The scope of the invention, however, is not limited to the illustrated examples.

First, the configuration of a communication system 100 according to the embodiment will be described. FIG. 1 is a diagram illustrating an exemplary overall configuration of the communication system 100 of the present embodiment. As illustrated in FIG. 1, the communication system 100 includes an electronic clock 1 (first communication device) and a smartphone 7 (second communication device) each serving as a communication device.

The electronic clock 1 includes a central processing unit (CPU) 41 (processor (first processor)), a memory 42 (storage unit), an oscillation circuit 45, a frequency divider circuit 46, a timekeeping circuit 47, an operation reception unit 51, a display unit (display) 52, a communication unit 53 (first transceiver), a power supply unit 60, and the like.

The CPU 41 is a processor that performs various types of arithmetic processing and integrally controls the operation of each constituent of the electronic clock 1. The CPU 41 reads and executes a program 421 stored in the memory 42 to perform various types of control operations.

The memory 42 provides a memory space for work to the CPU 41 and stores various types of data. The CPU 41 includes, for example, a random access memory (RAM) and a non-volatile memory. The RAM is used for arithmetic processing by the CPU 41 and stores temporary data. The non-volatile memory is, for example, a flash memory, and stores various types of settings, the program 421, and the like. The program 421 includes a program for performing processing in the electronic clock 1 of the sequence illustrated in FIG. 2.

The oscillation circuit 45 generates a clock signal at a predetermined oscillation frequency, for example, 32.768 kHz, and outputs the clock signal to the frequency divider circuit 46. The frequency divider circuit 46 frequency-divides the clock signal input from the oscillation circuit 45 such that conversion to a frequency required for the operation of each constituent of the electronic clock 1 is performed. The frequency divider circuit 46 outputs each signal at the corresponding frequency. The output destinations of the signals resulting from the frequency-dividing by the frequency divider circuit 46 include the timekeeping circuit 47.

The timekeeping circuit 47 counts a signal at a predetermined frequency input from the frequency divider circuit 46, and counts and holds the current date and time. The format of the date and time held by the timekeeping circuit 47 is not limited to that represented by year, month, day, hour, minute, and second, and thus may be an appropriate format suitable for processing by the CPU 41 or the like. The oscillation frequency of the oscillation circuit 45 slightly changes depending on the external environment such as temperature. Thus, the date and time counted by the timekeeping circuit 47 may deviate by up to 0.5 seconds per day under a normal environment, for example. The CPU 41 may correct the deviation of the date and time that the timekeeping circuit 47 counts, based on accurate date-and-time information that the communication unit 53 or the like of the electronic clock 1 has acquired from the smartphone 7.

The operation reception unit 51 receives an input operation from the outside such as a user and outputs the received input operation to the CPU 41 as an input signal. Here, the operation reception unit 51 includes, for example, a push button switch and/or a crown. Furthermore, the operation reception unit 51 may include a touch panel or the like overlapped with a digital display screen of the display unit 52.

The display unit 52 performs a display operation based on the control by the CPU 41. The display unit 52 includes the digital display screen and performs digital display, for example. Here, the display screen is, for example, a liquid crystal display screen or an organic electro-luminescent (EL) screen. Alternatively, the display unit 52 may have an analog display unit that represents information by a pointer indicating a sign, in addition to or instead of the digital display screen.

The communication unit 53 performs and controls data transmission and reception (communication) with an external device such as a smartphone 7. Here, the communication unit 53 includes an antenna, a transmission-and-reception circuit, and the like, and performs a short-range wireless communication (Bluetooth (registered trademark) low energy (BLE) communication in the present embodiment).

The power supply unit 60 supplies power at a predetermined operating voltage from a battery 61 to each constituent of the electronic clock 1 (the power may be indirectly supplied via the CPU 41 or the like). The battery 61 includes, for example, a solar panel and a storage battery. Furthermore, as the battery 61, a detachable dry battery, a button battery, or the like may be used. Alternatively, the power supply unit 60 may include, as the battery 61, a secondary battery such as a lithium ion battery, which is charged by being connected by a predetermined cable or via a connection terminal or by being coupled electromagnetically.

The smartphone 7 includes a CPU 71 (processor (second processor)), a memory 72, a communication unit 73 (second transceiver), an operation reception unit 74, a display unit (display) 75, and the like.

The CPU 71 reads a program stored in the memory 72 and performs various types of arithmetic processing to integrally control the operation of the smartphone 7.

The memory 72 stores temporary data related to computation by the CPU 71, and stores various types of programs (software) such as an operating system (OS) 721 and an application program (application) 722, and various types of data. The OS 721 includes a program for performing processing in the OS 721 of the sequence illustrated in FIG. 2. The application 722 includes a program for performing processing in the application 722 of the sequence illustrated in FIG. 2.

Here, the communication unit 73 can perform each of a short-range wireless communication (BLE communication), communication via the Internet over a wireless local area network (LAN) or the like (packet communication), and a telephone communication via a telephone line that are communicable with the electronic clock 1. The communication unit 73 can acquire date-and-time information (universal time coordinated: UTC) from time servers around the world via the Internet.

The operation reception unit 74 includes a touch panel overlapped with a digital display screen of the display unit 75, a push button switch, and the like. The operation reception unit 74 receives an input operation from the outside such as a user and outputs the received input operation to the CPU 41 as an input signal.

The display unit 75 performs a display operation based on the control by the CPU 71. The display unit 75 includes, for example, the digital display screen such as a liquid crystal display screen or an organic EL screen, and performs digital display, for example.

The smartphone 7 may also include other constituent elements normally included in a smartphone, such as a voice output unit; a report operation unit that outputs a beep sound, vibration, and the like; and a power supply unit.

Next, the operation in the communication system 100 will be described.

In the communication system 100, the communication unit 53 communicates with the OS 721 and the application 722 of the smartphone 7, so that the electronic clock 1 can acquire date-and-time information from the smartphone 7 or receive various types of notifications such as an incoming call.

FIG. 2 is a sequence diagram illustrating of starting communication between the electronic clock 1 and the OS 721 and the application 722 of the smartphone 7. The operation of the electronic clock 1 illustrated in FIG. 2 is performed in collaboration with the CPU 41 and the program 421. The operation of OS 721 is performed in collaboration with the CPU 71 and the OS 721. The operation of the application 722 is performed in collaboration with the CPU 71 and the application 722. In FIG. 2, there will be described, as an example, a case where the electronic clock 1 and the OS 721 and the application 722 perform a BLE communication; however, it may be applied to a case where a different communication scheme is used to perform communication.

First, the electronic clock 1 causes the communication unit 53 to transmit an advertisement (ADV) (Step S1). After the communication unit 73 receives the advertisement from the electronic clock 1, the OS 721 of the smartphone 7 notifies the application 722 of the reception, and in response to a connection request (connection req) from the application 722, the communication unit 73 transmits the connection request to the electronic clock 1 (Step S2) and notifies the application 722 of the completion of the connection (connection complete) (Step S3). As a result, the electronic clock 1 and the OS 721 and the application 722 enter a connection state (Step S4).

In the connection state, the application 722 performs a connection sequence including a service discovery to the electronic clock 1 by the communication unit 53 via the OS 721 (Step S5).

Here, a service discovery is a protocol for searching for available services possessed by an intended communication device. The application 722 performs such a service discovery to the electronic clock 1 via the OS 721, which enables the electronic clock 1 to search for a service available on the electronic clock 1, specify the handle of the service and the like to be used, and use the service. For example, in order to write date-and-time information to the electronic clock 1, specifying that, for example, the time service for the electronic clock 1 has a handle with any of 0x0000 to 0xffff enables writing the date-and-time information to the specified handle.

After the connection sequence ends, the application 722 causes, via the OS 721, the communication unit 73 to perform a request for writing the date-and-time information to the electronic clock 1 (write request) (Step S6). Here, the application 722 has acquired the date-and-time information from a time server, and performs a request for writing the date-and-time information to the electronic clock 1.

After the communication unit 53 receives the request for writing the date-and-time information, the electronic clock 1 causes the communication unit 53 to perform a response (write response) to the application 722 of the smartphone 7 (Step S7). Then, the CPU 41 of the electronic clock 1 corrects date-and-time information that the timekeeping circuit 47 counts, based on the date-and-time information written by the application 722 (Step S8).

After receiving the response (write response) from the electronic clock 1 received by the communication unit 73 via the OS 721, the application 722 performs control such that the communication unit 73 transmits no information to the electronic clock 1, and performs display indicating that the application 722 is on standby (standby for communication), on the display unit 75 (Step S9).

After correcting the date-and-time information ends, the CPU 41 of the electronic clock 1 causes the communication unit 53 to perform a service discovery to the OS 721 of the smartphone 7 (Step S10). Due to the service discovery to the OS 721, the electronic clock 1 searches for a service required for receiving a notification of time change by the OS 721 (current time service), a service required for receiving a notification (for example, incoming call) (apple notification center service), and the like. Then, the electronic clock 1 specifies the handles of the current time service, the apple notification center service, and the like, and registers a handle for use into the OS 721. As a result, the electronic clock 1 can use the desired service.

Here, the electronic clock 1 is triggered due to the end of the response to the request for witting on the date-and-time information (write response) from the application 722, and performs control such that the communication unit 53 starts the service discovery to the OS 721 for use of the service of the OS 721 as described above. At this time, if communication between the electronic clock 1 and the application 722 is performed in addition to the service discovery communication between the electronic clock 1 and the OS 721, the load on the CPU 41 of the electronic clock 1 becomes larger, so that the CPU 41 may lose the sequence. Therefore, the application 722 is triggered due to the end of reception of the response to the request for writing (write response) from the electronic clock 1, determines that the electronic clock 1 is to start the service discovery to the OS 721, and performs control such that the application 722 transmits no information to the electronic clock 1. In addition, the application 722 is triggered due to the end of reception of the response to the request for writing (write response) from the electronic clock 1, and performs the standby display on the display unit 75. Thus, the application 722 performs control such that the application 722 transmits no information to the electronic clock 1 due to a user operation, during the service discovery communication between the electronic clock 1 and the OS 721. Note that in order to transmit no information from the application 722 to the electronic clock 1 during the service discovery communication between the electronic clock 1 and the OS 721, the application 722 may perform control such that the application 722 does not receive part of the user operation.

After the service discovery ends, the electronic clock 1 causes the communication unit 53 to transmit a service-discovery end notification (handle value notification) to the application 722, to notify the application 722 that communication with the application 722 is allowed (Step S1). After receiving the service-discovery end notification from the electronic clock 1 by the communication unit 73, the application 722 cancels the display that the application 722 is on standby, on the display unit 75 (Step S12).

Here, conventionally, an application 722 was triggered due to reception of a write response from an electronic clock 1 and entered the standby state for a predetermined time such that no communication was performed from the application 722 to the electronic clock 1 until the predetermined time elapsed. The time required for a service discovery, however, varied depending on the state of OS 721 or the like and was uncertain. Thus, the standby time (above predetermined time) of the application 722 was set to be longer. As a result, a useless standby time occurred before communication from the application 722 to the electronic clock 1, and it took time for the communication longer than necessary.

Therefore, in the present embodiment, the electronic clock 1 transmits a service-discovery end notification to the application 722 after the service discovery to the OS 721 ends. As a result, the application 722 can recognize that the service discovery from the electronic clock 1 to the OS 721 has ended and the electronic clock 1 is communicable with the application 722. Thus, the application 722 can cancel the standby display immediately after the service discovery ends, and can start communication with the electronic clock 1. Therefore, in addition to avoidance of duplication in communication between the electronic clock 1 and the OS 721 and between the electronic clock 1 and the application 722, time until starting the communication with the application 722 can be shorten after the communication with the OS 721. As a result, time for communication on the application 722 can be shortened.

Note that FIG. 2 illustrates the sequence in which the application 722 writes the date-and-time information of the electronic clock 1. However, in a case where there is no need to update the date-and-time information, the application 722 may transmit a command indicating the fact to the electronic clock 1, and then may determine that the electronic clock 1 is to start the service discovery to the OS 721. Thereafter, the application 722 may perform control such that the communication unit 73 transmits no information from the application 722 to the electronic clock 1, and may perform display indicating that the application 722 is standby, on the display unit 75.

Furthermore, before starting the service discovery to the OS 721, the CPU 41 of the electronic clock 1 may cause the communication unit 53 to transmit, to the application 722, the notification that the electronic clock 1 is to start the service discovery to the OS 721. Then, in a case where the communication unit 73 has received the notification that the electronic clock 1 is to start the service discovery to the OS 721, the application 722 may determine that the electronic clock 1 is to start the service discovery to the OS 721. Thereafter, the application 722 may perform control such that the communication unit 73 transmits no information from the application 722 to the electronic clock 1, and may perform the display indicating that the application 722 is standby, on the display unit 75.

As described above, the electronic clock 1 of the communication system 100 includes the communication unit 53 that communicates with the smartphone 7 including the first software (for example, OS 721) and the second software (for example, the application 722), and the CPU 41. The CPU 41 performs control such that the communication unit 53 performs a certain communication (for example, service discovery) with the first software. After this communication ends, the communication unit 53 transmits, to the second software, a notification for notifying an end of this communication. Conventionally, in communication between an electronic clock and a smartphone, if the timing at which a service discovery is being performed from the electronic clock to the operating system (OS) of the smartphone and the timing at which the application program (application) of the smartphone communicates with the electronic clock overlap, the CPU of the electronic clock is burdened heavily, so that the CPU may lose the sequence. Therefore, in order to avoid this issue, traditionally, a presetting is made such that no communication is performed from the application to the electronic clock during the time zone in which the electronic clock performs a service discovery to the OS. However, in the conventional method, even if the service discovery has ended, no communication is performed from the application to the electronic clock until a predetermined time zone has passed. As a result, before communication from the application to the electronic clock, there is a case where a useless standby time occurs that leads to taking time for the communication longer than necessary. The above drawback is not limited to such communication between the electronic clock and the smartphone, but may occur in communication between a communication device and two pieces of software of another communication device. However, according to the above embodiment, the second software of the smartphone 7 can recognize that this communication between the electronic clock 1 and the first software has ended, and after this communication ends, the second software can start communication with the electronic clock 1. As a result, in a case where the electronic clock 1 communicates with the two pieces of software of the smartphone 7, after communication with one of the two pieces of software, time until starting communication with the other one thereof can be shorten.

Alternatively, after a certain command communication with the second software (for example, transmission of a response to a request for writing date-and-time information) ends, the CPU 41 performs control such that the communication unit 53 performs the above certain communication with the first software. Thus, the second software can recognize the timing of starting communication between the electronic clock 1 and the first software, which enables avoiding duplication in communication between the first software and the electronic clock 1 and between the second software and the electronic clock 1.

Furthermore, before starting the above certain communication, the CPU 41 causes the communication unit 53 to transmit, to the second software, a notification that this communication is to start. Thus, the second software can recognize the timing of starting communication between the electronic clock 1 and the first software, which enables avoiding duplication in communication between the first software and the electronic clock 1 and between the second software and the electronic clock 1.

In addition, the smartphone 7 of the communication system 100 includes the CPU 71 that performs control with the first software (OS 721) and the second software (application 722), and the communication unit 73 that communicates with the electronic clock 1. While the first software is making the communication unit 73 perform a certain communication (service discovery) with the electronic clock 1, the second software performs control such that the communication unit 73 transmits no information from the second software to the electronic clock 1. The second software performs control such that the communication unit 73 transmits information from the second software to the electronic clock 1, after the timing at which the communication unit 73 receives, from the electronic clock 1, a notification for notifying an end of this communication.

Therefore, it can be avoided that the first software and the second software perform a duplicate communication with the electronic clock 1. In addition, after receiving the notification that the communication between the first software and the electronic clock 1 has ended, the communication between the second software and the electronic clock 1 starts, which enables shortening the time until starting the communication between the second software and the electronic clock 1.

For example, in a case where a certain command communication between the electronic clock 1 and the second software (for example, transmission and reception of a write response to a request for writing date-and-time information) has ended, the second software determines that the above certain communication is to start, and performs control such that the communication unit 73 transmits no information from the second software to the electronic clock 1. Therefore, during the certain communication between the first software and the electronic clock 1 that starts after this command communication ends, it can be avoided that the first software and the second software perform a duplicate communication with the electronic clock 1.

Furthermore, for example, in a case where the communication unit 73 has received, from the electronic clock 1, a notification that the above certain communication is to start, the second software determines that this communication is to start and performs control such that the communication unit 73 transmits no information from the second software to the electronic clock 1. Therefore, during this communication between the first software and the electronic clock 1, it can be avoided that the first software and the second software perform a duplicate communication with the electronic clock 1.

In addition, the smartphone 7 includes the display unit 75, and while the first software is making the communication unit 73 perform this communication with the electronic clock 1, the second software causes the display unit 75 to perform a display indicating that the second software is standby.

Therefore, during a service discovery communication between the electronic clock 1 and the OS 721, it can be prevented that no user operation is performed on the smartphone 7, which enables avoiding duplication in communication between the first software and the electronic clock 1 and between the second software and the electronic clock 1.

Furthermore, the second software performs communication with the electronic clock 1 by the communication unit 73 via the first software. Thus, prioritization of the above certain communication between the first software and the electronic clock 1 enables a subsequent communication between the second software and the electronic clock 1 to be performed smoothly.

Note that the description in the above embodiment is an example of a preferable communication system according to the present invention, and thus is not limited thereto.

For example, in the above embodiment, there has been exemplarily described the case where the communication devices serve as the electronic clock 1 and the smartphone 7, the first software serves as the OS 721, the second software serves as the application 722, and the above certain communication serves as the service discovery. However, these are examples and thus are not particularly limited.

Furthermore, the above description has been taken, as the examples, the memory 42 and the memory 72 each including a non-volatile memory such as a flash memory; a mask ROM; or the like as a computer-readable medium for storing the program 421, or for storing the OS 721 and the application 722; however, the computer-readable medium is not limited to these examples. As other computer-readable media, portable recording media such as a hard disk drive (HDD), a compact disc (CD)-ROM, and a digital versatile disc (DVD) are applicable. Still furthermore, a carrier wave is also applicable as a medium for providing data of the program according to the present embodiment via a communication line.

In addition, specific details such as the configuration, settings, control contents, and control procedures described in the above embodiment can be appropriately changed without departing from the gist of the present invention.

Although the embodiment has been described, the scope of the present invention is not limited to the above embodiment, and thus includes the scope of the invention described in the claims and the equivalent scope thereof.

The invention claimed is:

1. A communication device comprising:
   a transceiver configured to communicate with another communication device including first software and second software; and
   at least one processor configured to:
      control the transceiver to transmit, to the another communication device, a first notification for notifying the second software of an end of a first communication with the second software, the first notification causing the second software to be on standby and to not transmit information via the another communication device to the communication device;

based on the end of the first communication, control the transceiver to perform a second communication with the first software; and after an end of the second communication with the first software at a variable time, cause the transceiver to transmit, to the another communication device, a second notification for notifying the second software of the end of the second communication with the first software, the second notification causing the second software to cancel being on standby and cancel not transmitting information via the another communication device to the communication device.

2. An electronic clock comprising:
the communication device according to claim 1; and
a time keeping circuit.

3. The electronic clock according to claim 2,
wherein the at least one processor is configured to:
correct time information generated by the time keeping circuit based on information received during the first communication.

4. The communication device according to claim 1,
wherein the first software is an operating system (OS), and
wherein the second software is an application program.

5. The communication device according to claim 1,
wherein the second communication is communication for the communication device to search for a service available on the first software.

6. A communication device, comprising:
at least one processor configured to perform control with first software and second software; and
a transceiver configured to communicate with another communication device,
wherein the at least one processor is configured to:
control the transceiver to receive, from the another communication device, a first notification for notifying the second software of an end of a first communication with the second software;
in response to the first notification, cause the second software to be on standby and not transmit information via the transceiver to the another communication device;
based on the end of the first communication, control the transceiver to perform a second communication between the another communication device and the first software;
after an end of the second communication with the first software at a variable time, cause the transceiver to receive, from the another communication device, a second notification for notifying the second software of the end of the second communication with the first software; and
in response to the second notification, cause the second software to cancel being on standby and cancel not transmitting information via the transceiver to the another communication device.

7. The communication device according to claim 6, further comprising:
a display,
wherein the at least one processor is configured to, while the first software is performing the second communication with the another communication device, cause the display to display that the second software is on standby.

8. The communication device according to claim 6,
wherein the second software causes, via the first software, the transceiver to communicate with the another communication device.

9. A communication method by a communication device including a transceiver configured to communicate with another communication device including first software and second software; and at least one processor, the communication method comprising:
controlling, by the at least one processor, the transceiver to transmit, to the another communication device, a first notification for notifying the second software of an end of a first communication with the second software, the first notification causing the second software to be on standby and to not transmit information via the another communication device to the communication device;
based on the end of the first communication, controlling, by the at least one processor, the transceiver to perform a second communication with the first software; and
after an end of the second communication with the first software at a variable time, causing, by the at least one processor, the transceiver to transmit, to the another communication device, a second notification for notifying the second software of the end of the second communication with the first software, the second notification causing the second software to cancel being on standby and cancel not transmitting information via the another communication device to the communication device.

* * * * *